United States Patent [19]

Kim

[11] Patent Number: 5,331,825
[45] Date of Patent: Jul. 26, 1994

[54] AIR CONDITIONING SYSTEM

[75] Inventor: Tae D. Kim, Suwon-City, Rep. of Korea

[73] Assignee: Samsung Electronics, Co., Ltd., Suwon-City, Rep. of Korea

[21] Appl. No.: 28,532

[22] Filed: Mar. 8, 1993

[30] Foreign Application Priority Data

Mar. 7, 1992 [KR] Rep. of Korea .................. 92-3783
Mar. 7, 1992 [KR] Rep. of Korea .................. 92-3784

[51] Int. Cl.⁵ .................. F25D 17/00; G05D 23/00
[52] U.S. Cl. .................. 62/180; 236/51; 454/258
[58] Field of Search ............ 236/51, 916; 454/258; 62/180

[56] References Cited

FOREIGN PATENT DOCUMENTS

| 0095054 | 7/1980 | Japan | 236/51 |
| 0195232 | 8/1986 | Japan | 236/51 |
| 64-79532 | 3/1989 | Japan . | |
| 0147243 | 6/1989 | Japan | 236/51 |

Primary Examiner—William E. Wayner
Attorney, Agent, or Firm—Burns, Doane, Swecker & Mathis

[57] ABSTRACT

An air conditioning system and a control method thereof enables an infrared-ray detecting portion to detect the number of people and their moving area and controls the direction of a louver and an amount of air forced by a room blower fan, the swing of the louver being adjusted according to the movement state and the number of people so as to make the users feel a comfortable air conditioning environment at every area of room.

12 Claims, 11 Drawing Sheets

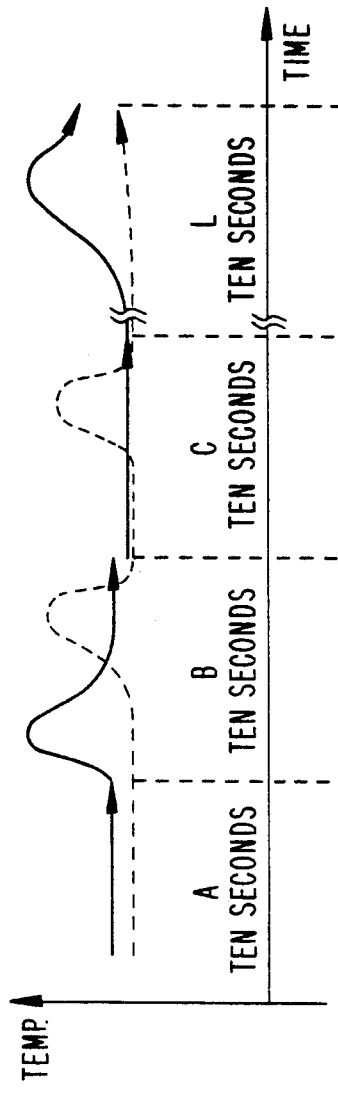

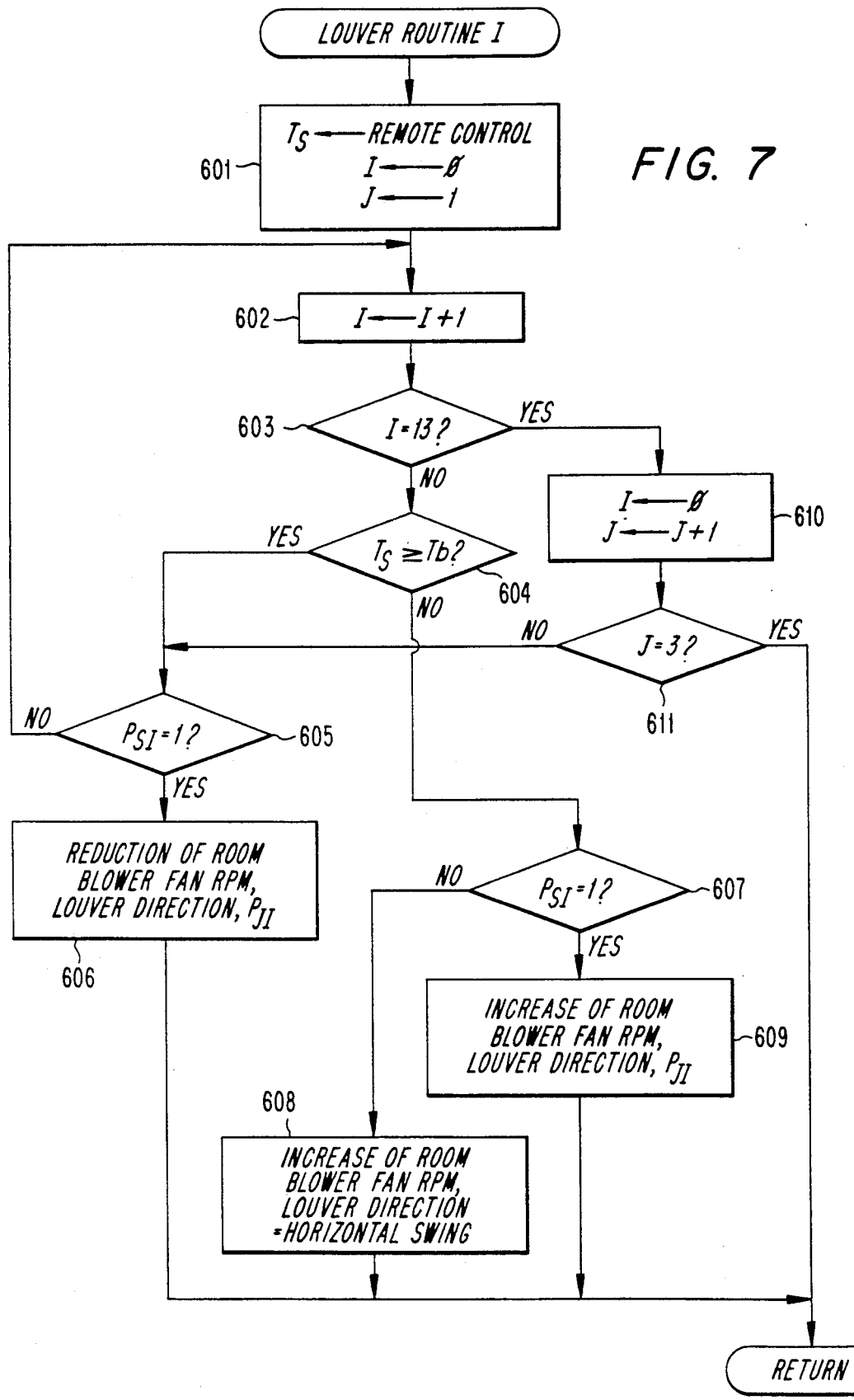

AIR CONDITIONING SYSTEM

BACKGROUND OF THE INVENTION

1. Field of the Invention

The invention relates to providing an air conditioning system, and particularly, to providing a control method of an air conditioner for adjusting the direction and amount of forced air dependent upon the presence and the area of motion of a person in order to optimally air condition a room.

2. Related Art

A conventional air conditioner is configured to air condition a room against a room load fluctuation. This is accomplished by calculating the difference between a set temperature and a detected temperature, adjusting an amount of forced air and controlling a compressor until the room temperature reaches the set temperature based on the calculated temperature difference. But, the conventional air conditioner judges the room load fluctuation only by the returned air and air conditions the total area of room independent of the location of a person in the room, so that, the person might wait for a long time to be in a properly air conditioned environment.

In order to resolve this disadvantage, Japanese Laid-Open Patent Publication No. 89-79532 discloses a control method for adjusting the direction of the air blown from an air conditioner and an apparatus thereof. This apparatus comprises a plurality of detecting means including an infrared-ray directional sensor, means for amplifying the infrared-ray signal, means for comparing the amplified signal with the reference signal, means for controlling the direction of the forced air, means for judging the location of a person by the output signal from the comparing means and means for operating the controlling means. This air conditioner detects the infrared-rays emitted from a body, so that the direction of forced air is controlled by driving a louver toward the location of a person or an area occupied by a large number of people in the case of a cooling machine, otherwise toward the location where no one is present, or an area occupied by a small number of people in the case of a warming machine. Therefore, it is the object of this air conditioner to control the drive of the louver to change the direction of forced air according to a determination of the existence or non-existence of a person by means of a body sensing means. It has disadvantages in that the desired efficiency of the air conditioning in an area of a person within a higher temperature environment (higher than the set temperature) can not be accomplished solely dependent upon the direction of forced air. A person in the room feels an air conditioned environment with a temperature beyond the previously set room temperature.

Thus, an object of the invention is to provide an air conditioning system for detecting the existence or non-existence and moving area of a person in room and controlling the direction and an amount of forced air taking into consideration the temperature control throughout the room.

Another object of the invention is to provide an air conditioning control method for enabling a detecting means such as an infrared-ray sensor to scan an area divided into a predetermined number of divided areas, detecting the existence or non-existence and moving area of a person in the room, and controlling the driving direction of a louver and the operation of a room blower fan and a compressor.

Another object of the invention is to provide an air conditioning control method for detecting the existence or non-existence and moving area of a person in room and controlling the temperature throughout the room.

Another object of the invention is to provide an air conditioning control method for warming a room by forcing air in a direction avoiding the presence and moving area of a person.

SUMMARY OF THE INVENTION

In order to accomplish these and other purposes, the invention comprises means for scanning a total area, which is divided into a predetermined number of divided areas, in upward, downward, leftward and rightward directions so as to detect infrared-rays emitted from a human body, and means for controlling the movement of the detecting means to a predetermined divided area, determining the existence or non-existence and the movement of a person and controlling the driving direction of a louver, the operation of a room blower fan and a compressor.

An air conditioning control method of the invention comprises the steps of enabling an infrared-ray sensor to scan a total area which is divided into a predetermined number of divided areas and detect the temperature of a divided area for a predetermined time period, calculating the difference between the detected temperature and a room temperature, judging whether the temperature difference is above a predetermined temperature or above the predetermined radiation temperature, determining the completion of the detection with respect to the location of a person and the total divided areas, calculating the difference between the room temperature and the setting temperature to determine whether the existence of a person is detected and comparing the temperature of an area in which a person is detected with the temperature of areas adjacent to the person detected area, and controlling the direction of forced air by a louver, an amount of forced air of a room blower fan and the operation of a compressor.

An air conditioning control method according to another embodiment of the invention comprises the steps of detecting the existence or non-existence and the moving area of a person, calculating the difference between the room temperature and the radiation temperature, determining the radiation temperature and the location of the person and controlling the direction and an amount of forced air of each of a louver and a room blower fan in at least two steps.

BRIEF DESCRIPTION OF THE DRAWINGS

The invention will be explained below in detail with reference to the accompanying drawings; in which

FIGS. 4A and 4B are a graph and a table showing the state of the existence or non-existence of a person detected by the infrared-ray detecting portion according to a principle of the invention;

FIG. 7 is a flow chart showing a method of controlling the direction or an amount of forced air when one person occupies a room to be air conditioned according to other embodiment of the invention; and, FIG. 8 is a flow chart showing a method of controlling the direction or an amount of forced air when at least two persons are present in a room to be air conditioned according to other embodiment of the invention.

DETAILED DESCRIPTION OF THE INVENTION

Figure 1:
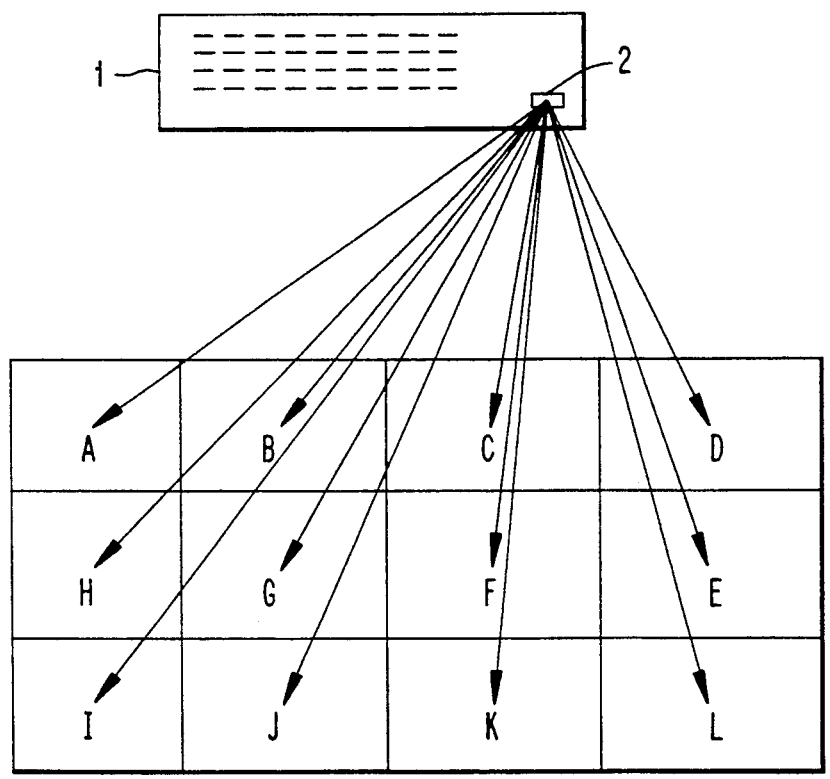
FIG. 1 is a view showing one example of a method for detecting the existence or non-existence of a person in a total area divided into a predetermined number of divided areas by means of an infrared-ray detecting portion according to a principle of the invention.

FIG. 1 is an illustrative view showing the procedures by which an infrared-ray detecting portion monitors a predetermined number of divided areas according to a principle of the invention. An air conditioner 1 includes an infrared-ray detecting portion 2 for detecting the existence or non-existence of a person in twelve divided areas A to L.

Figure 2:
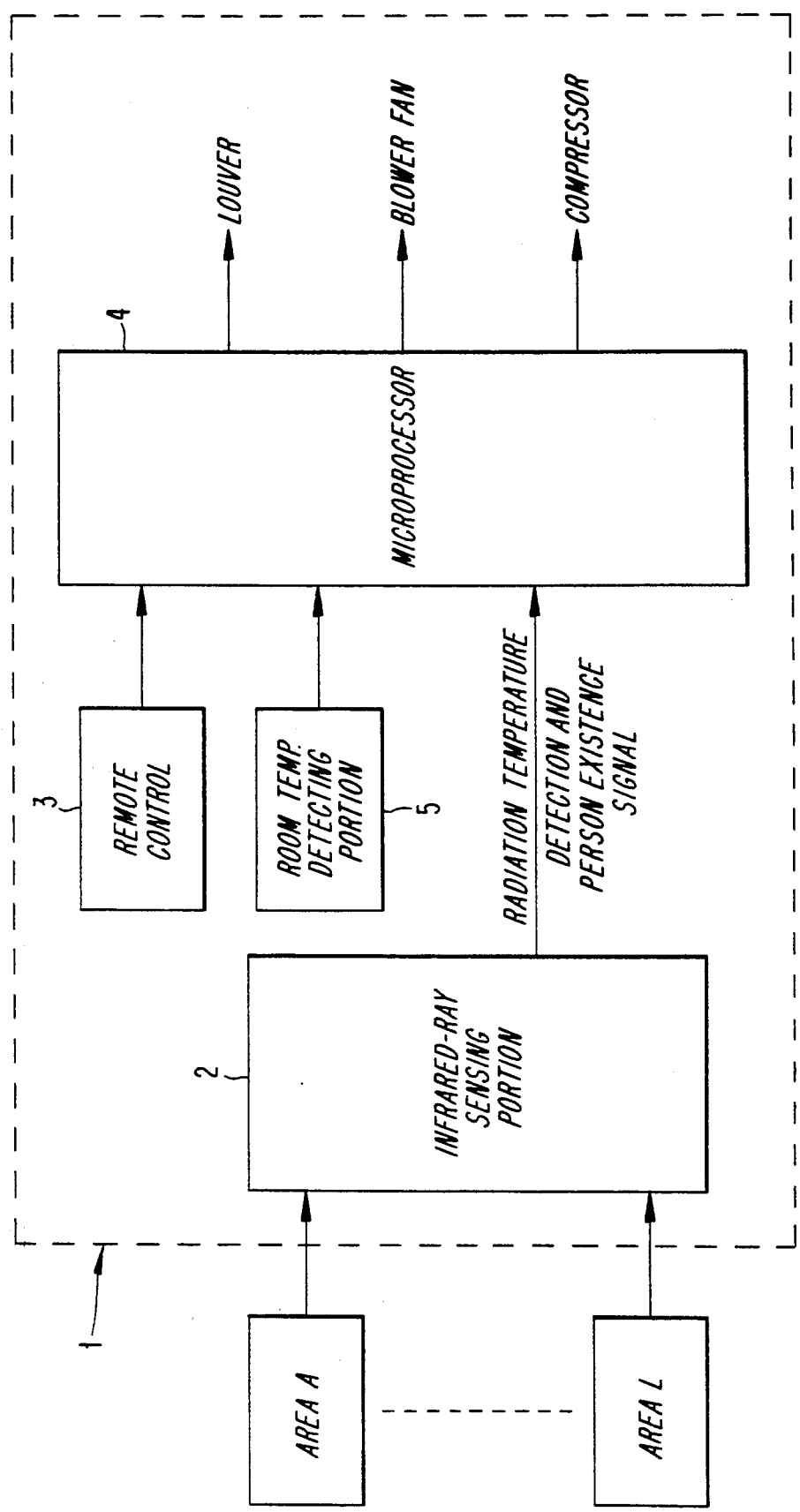
FIG. 2 is a block diagram showing an air conditioning system according to the invention.

FIG. 2 is a control block diagram of an air conditioning system according to the invention. The air conditioning system is provided with an infrared-ray detecting portion 2 for detecting the existence or non-existence and moving area of a person, or a number of people, and a temperature in a room and for outputting a detected state signal, a portion 5 for detecting the room temperature, a remote control 3 for inputting the operation mode of an air conditioner and a set room temperature and a microprocessor 4 for receiving signals from the infrared-ray detecting portion 2, the remote control 3 and the room temperature detecting portion 5 and controlling the direction and an amount of forced air and the operation of a compressor according to the predetermined system programming.

Figure 3:
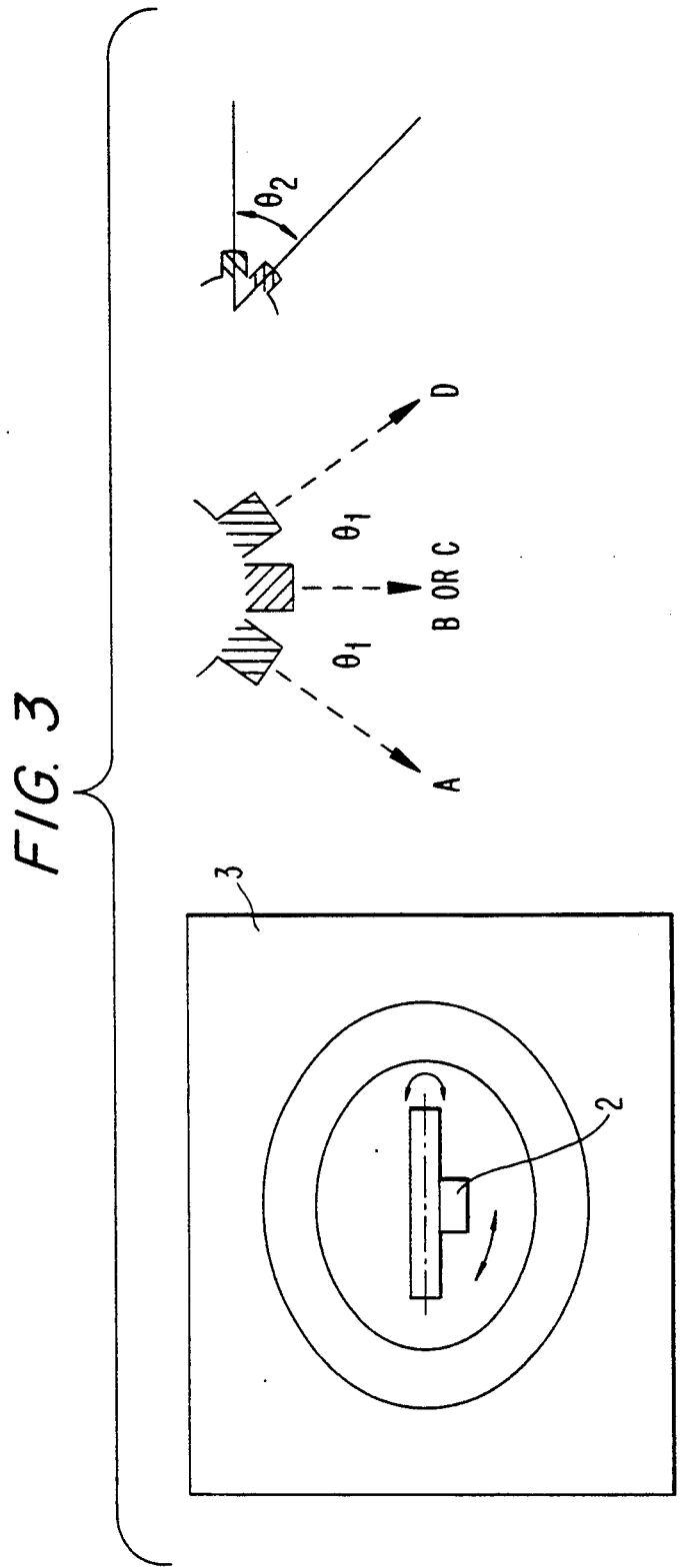
FIG. 3 is a schematically view showing the operation state of the infrared-ray detecting portion of the air conditioning system according to the invention.

FIG. 3 is a schematic view showing the operation of an infrared-ray detecting portion according to the invention. The infrared-ray detecting portion 2 includes an infrared-ray sensor capable of moving upward, downward, leftward and rightward so as to detect the existence or non-existence of a person in room. The infrared-sensor is rotated at the predetermined angle around the vertical and horizontal rotation axles by means of a step motor (not shown). In other words, the infrared-ray sensor scans from an area B to an area A or from an area C to an area D at the predetermined angle $\theta_1$ and from the up position to the lower position at the predetermined angle $\theta_2$.

FIG. 4 is a view showing an example of when an infrared-ray detecting portion detects the existence of a person in room areas A-L. FIG. 4A is a signal waveform showing the detection of the existence of a person by an infrared-ray detection portion. The infrared-ray sensor of the detecting portion 2 is moved to every area at 10 second intervals and outputs the signal of a raised waveform as shown by the solid line when the existence of a person is detected. FIG. 4B shows the determining method of a microprocessor 4 with respect to the current position of a person associated with each area of FIG. 4A according to the detected radiation temperature and the moving state of a person.

Figure 5A:
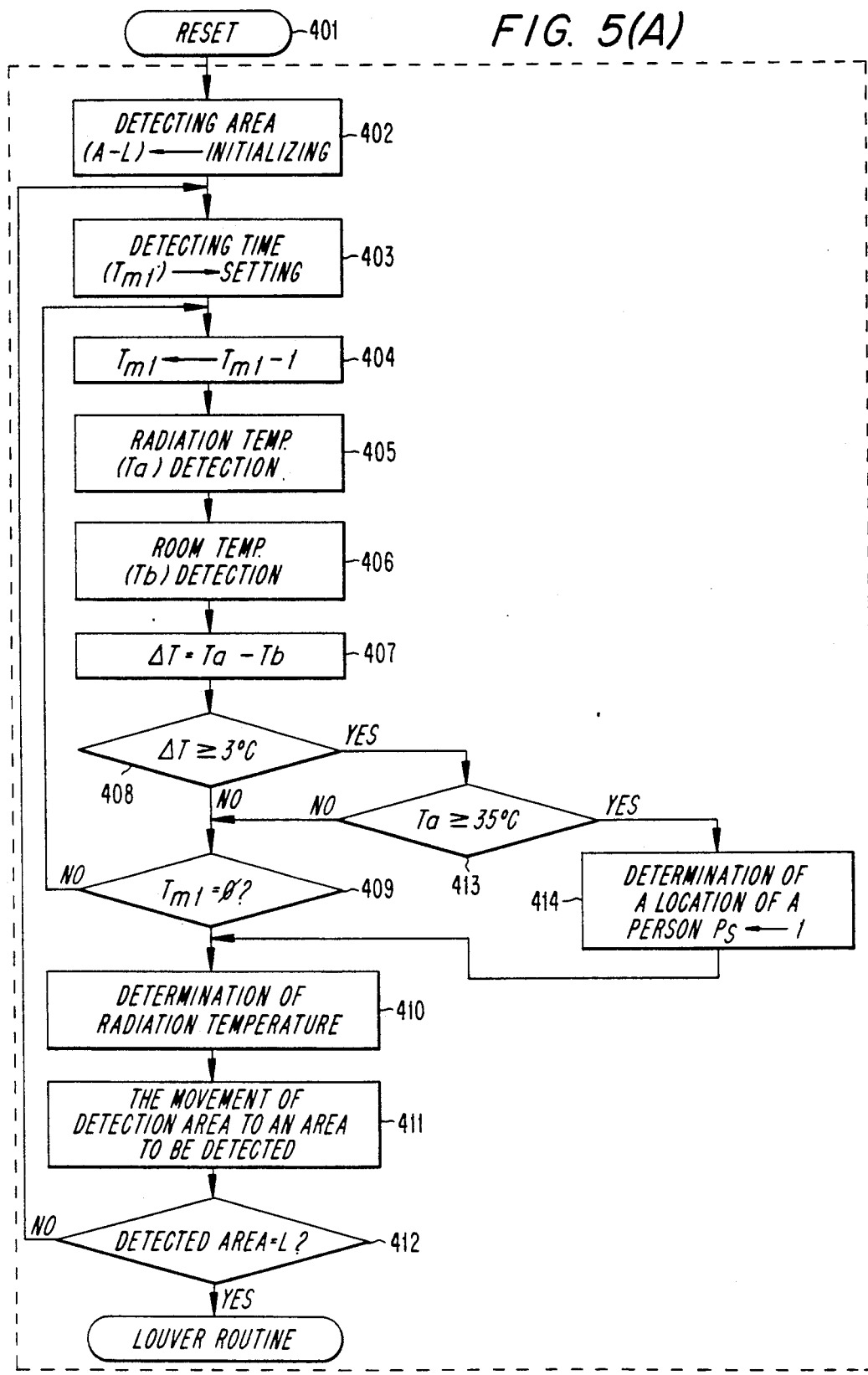
FIGS. 5A, 5B and 5C are flow charts showing a method of controlling the direction or an amount of forced air according to the invention.
Figure 5B:
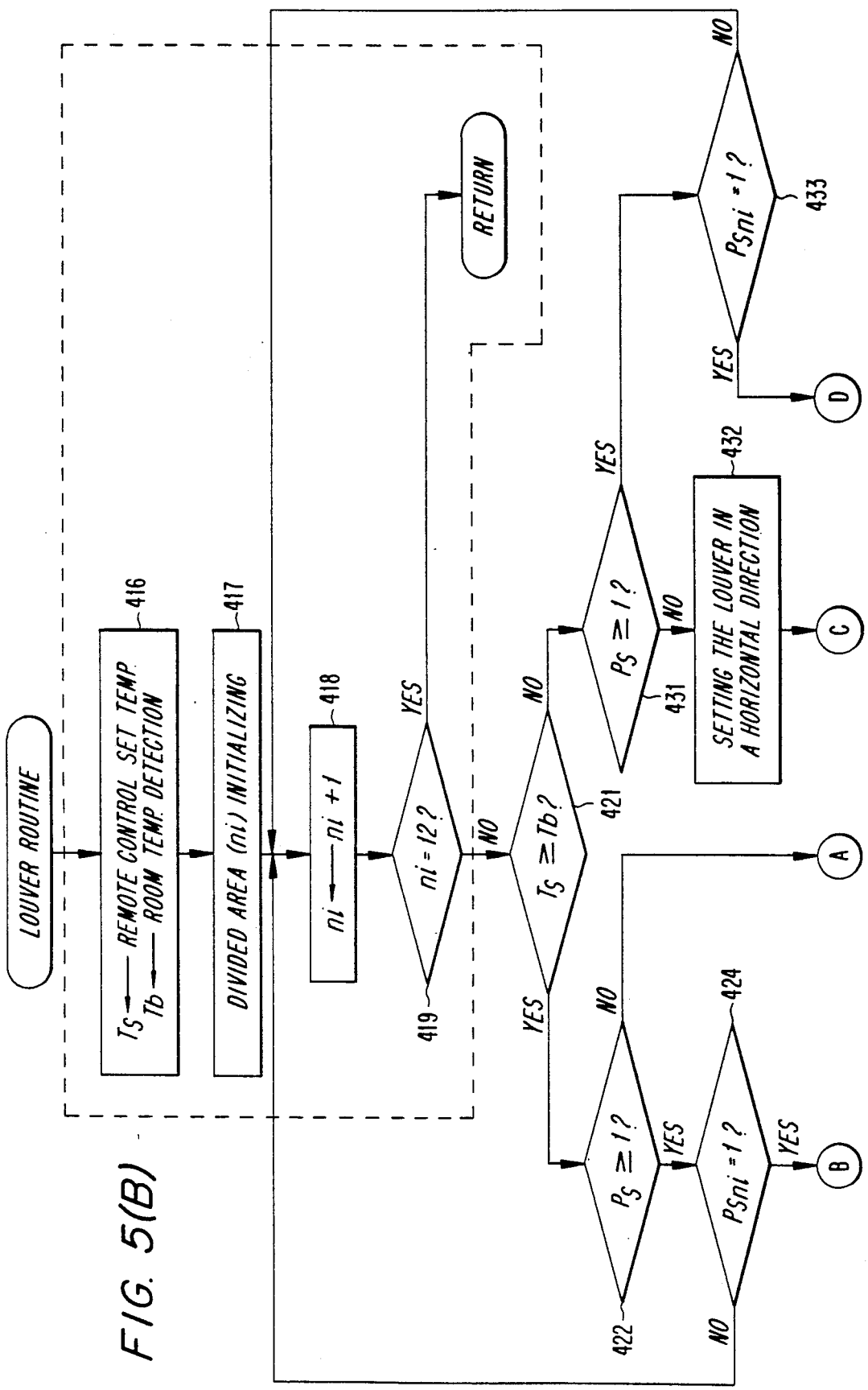
Figure 5C:
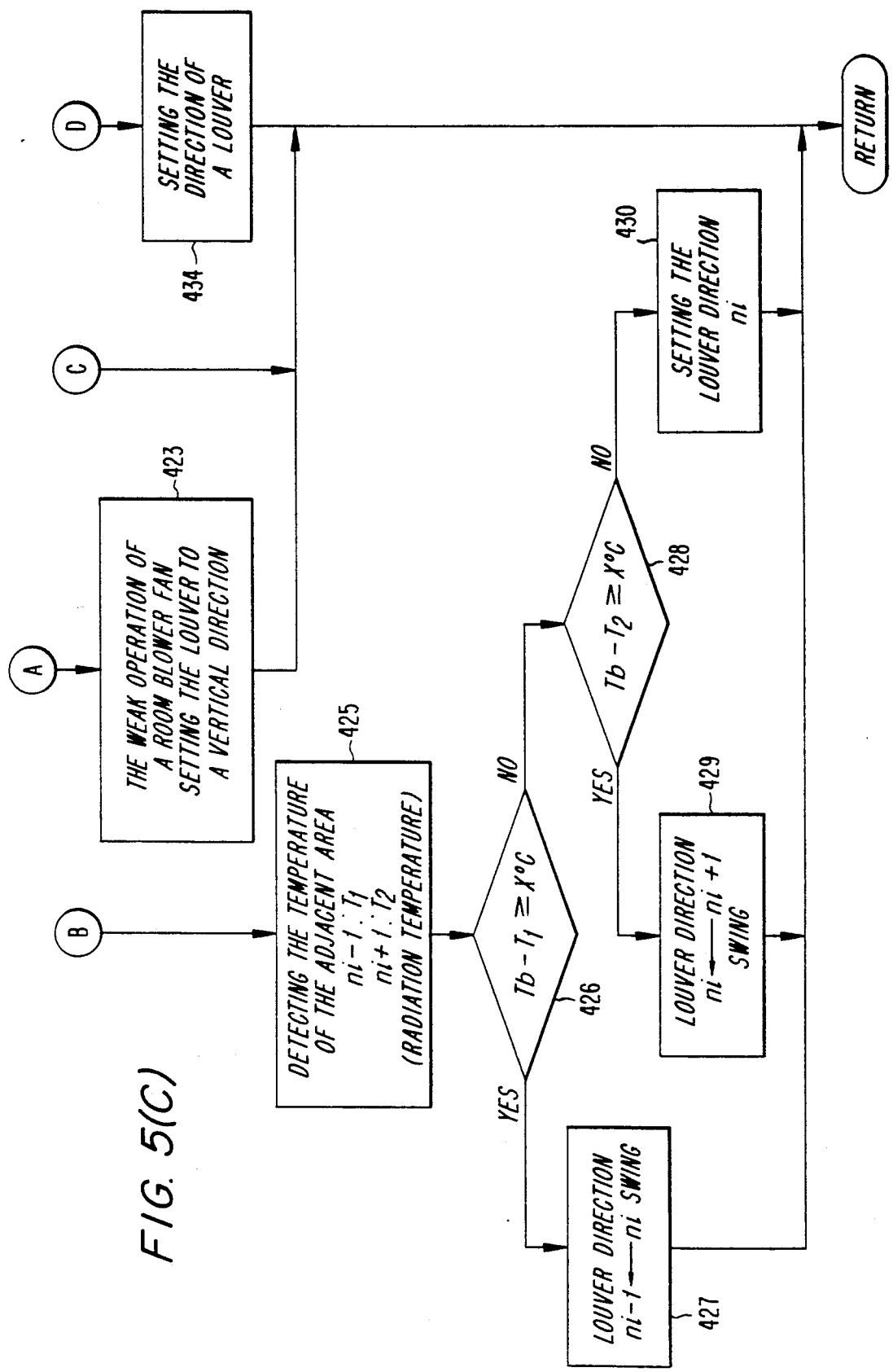

FIGS. 5A, 5B and 5C are flow charts illustrating a control method of an air conditioning system according to one embodiment of the invention. An air conditioner 1 is first reset by applying a power source thereto. At the initial reset step 401, a microprocessor 4 receives signals for an operation mode, for example, a cooling mode or a warming mode and the set temperature from the remote control 3 or the other control portion having a plurality of input keys. The microprocessor 4 performs a step 402 of moving the infrared-ray detecting portion 2 to the initial position A of areas A-L. Step 402 goes to step 403 to set the detecting time, for example 10 seconds, corresponding to every area. At step 404 the detecting time is decremented. At step 405 the signal of the radiation temperature $T_a$ detected in any room area is received. At step 406 the room temperature $T_b$ is detected by the room temperature detecting portion 5.

Thereafter, microprocessor 4 calculates the difference $\Delta T$ between the radiation temperature $T_a$ and the room temperature $T_b$ at step 407. Step 407 proceeds to step 408 to determine whether the value of the temperature difference $\Delta T$ is over 3° C. Herein, it is noted that the radiation heat emanated from a human body is usually detected at 35° C. If the temperature difference $\Delta T$ is lower than 3° C., step 408 goes to step 409 to judge whether the detecting time is elapsed for the area A. After the lapse of the predetermined detecting time, at step 410 the radiation temperature is determined, and the sensor of the infrared-ray detecting portion 2 is moved to the next detecting area at step 411. In the procedure of repeating these movements of the sensor throughout areas to be detected, step 411 proceeds to step 412 after the elapse of a predetermined time to determine the completion of the detection with respect to the total area as divided into a predetermined number, for example 12, of divided areas.

When it is determined that the temperature difference $\Delta T$ is more than 3° C. at step 408, step 408 goes to step 413 to judge whether the radiation temperature $T_a$ is over 35° C. If not over 35° C., step 413 goes to step 409. Otherwise, at step 414 the position of a person is determined. Therefore, in this repeated procedure, the detection of a person is performed throughout the total area on an area-by-area basis at intervals of ten seconds, so that the microprocessor 4 detects the existence of a person in the corresponding areas B through L as shown in FIG. 4A.

Then, when the completion of the total area detection is determined at step 412, the microprocessor 4 executes a louver control routine. Firstly, at step 416 the set temperature $T_s$ and the room temperature $T_b$ are read from the remote control 3. At step 417, each area count $n_i$ for an area to be detected is initialized. At step 418 the area count $n_i$ is increased by one, while the location of a person is identified according to the signals from the infrared-ray detecting portion 2. Next, step 418 proceeds to step 419 to determine whether confirmation of a person's presence is finished for the total area. If completed, microprocessor 4 exits the louver control routine to return to another predetermined routine of an air conditioning system.

If the detection of a person in the areas is not completed, step 419 jumps to step 421 to determine whether the remote control set temperature $T_s$ is higher than the room temperature $T_b$ detected by the room temperature detecting portion 5. If the set temperature $T_s$ is above or equal to the room temperature $T_b$, or the set temperature $T_s$ is below the room temperature $T_b$ during the cooling mode operation, step 421 goes to step 422 to determine whether the existence of a person $P_s$ in the divided areas to be detected is confirmed. When no person $P_s$ is in the room, at step 423, a weak operation of the room blower fan is performed with the direction the louver at the vertical plane so as to keep the room temperature $T_b$ from being lowered lower than the set temperature $T_s$.

On the other hand, when the existence of a person $P_s$ is identified, step 422 goes to step 424 to determine whether the existence of a person in area $n_i$ is detected. If not, step 424 returns to step 418 to continue to detect a person occupying the next adjacent area $n_{i+1}$. At the time of identifying a person in area $n_i$, step 424 goes to step 425 to move the infrared-ray sensor to the previously detected area $n_{i-1}$ and the area to be detected $n_{i+1}$ adjacent to the current person detected area $n_i$ as well as to detect the temperatures $T_1$ and $T_2$ of each of the previously detected areas $n_{i+1}$ and the area to be detected $n_{i+1}$. When the temperatures $T_1$ and $T_2$ are detected, step 425 goes to step 426 to subtract the temperature $T_1$ of the previously detected area $n_{i-1}$ from the room temperature $T_b$ to determine whether the subtracted temperature is higher than a predetermined temperature X° C. If the subtracted value is above the predetermined value X° C., step 426 proceeds to step 427 to swing the louver to the adjacent area $n_{i-1}$. When the subtracted value is below the predetermined value X° C., step 426 goes to step 428 to subtract the detected temperature $T_2$ of the area to be detected $n_{i+1}$ from the room temperature $T_b$ as well as to determine whether the subtracted value is higher than the predetermined temperature X° C. If the subtracted value is above the predetermined value X° C., step 428 goes to step 429 to force the louver to be swung to the adjacent area $n_{i+1}$. If the subtracted value is below the predetermined value X° C., step 428 proceeds to step 430 to set the direction of the louver at the area $n_i$.

On the other hand, when the set temperature $T_s$ is lower than the room temperature $T_b$, step 421 jumps to step 431 to judge whether a person occupies the room. If not, step 431 goes on to step 432 to maintain the direction of the louver at the horizontal plane until the room temperature reaches the set temperature throughout the total area to be detected. But, when the person occupies the room, step 431 jumps to step 433 to judge whether the existence of a person is detected in any particular area $n_i$. If a person is not in the area $n_i$, step 433 returns to step 418 to increment the area count $n_i$ by one. If the location of the person is the same as that of area $n_i$ to be detected, step 433 goes to step 434 to perform air conditioning while directing the louver to the location of the person.

Figure 6A:
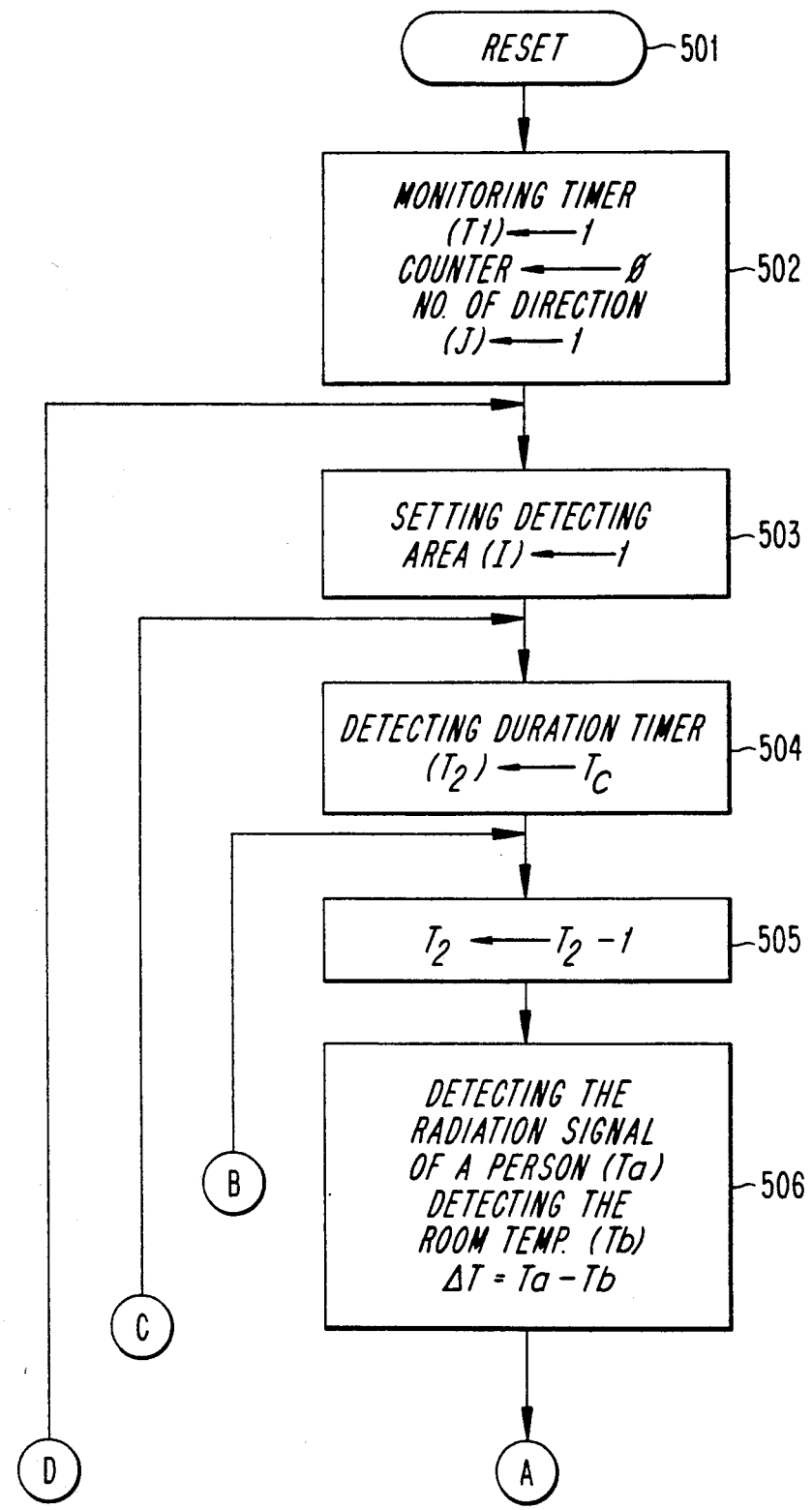
FIGS. 6A and 6B are flow charts showing a method of controlling the direction or an amount of forced air according to other embodiment of the invention.
Figure 6B:
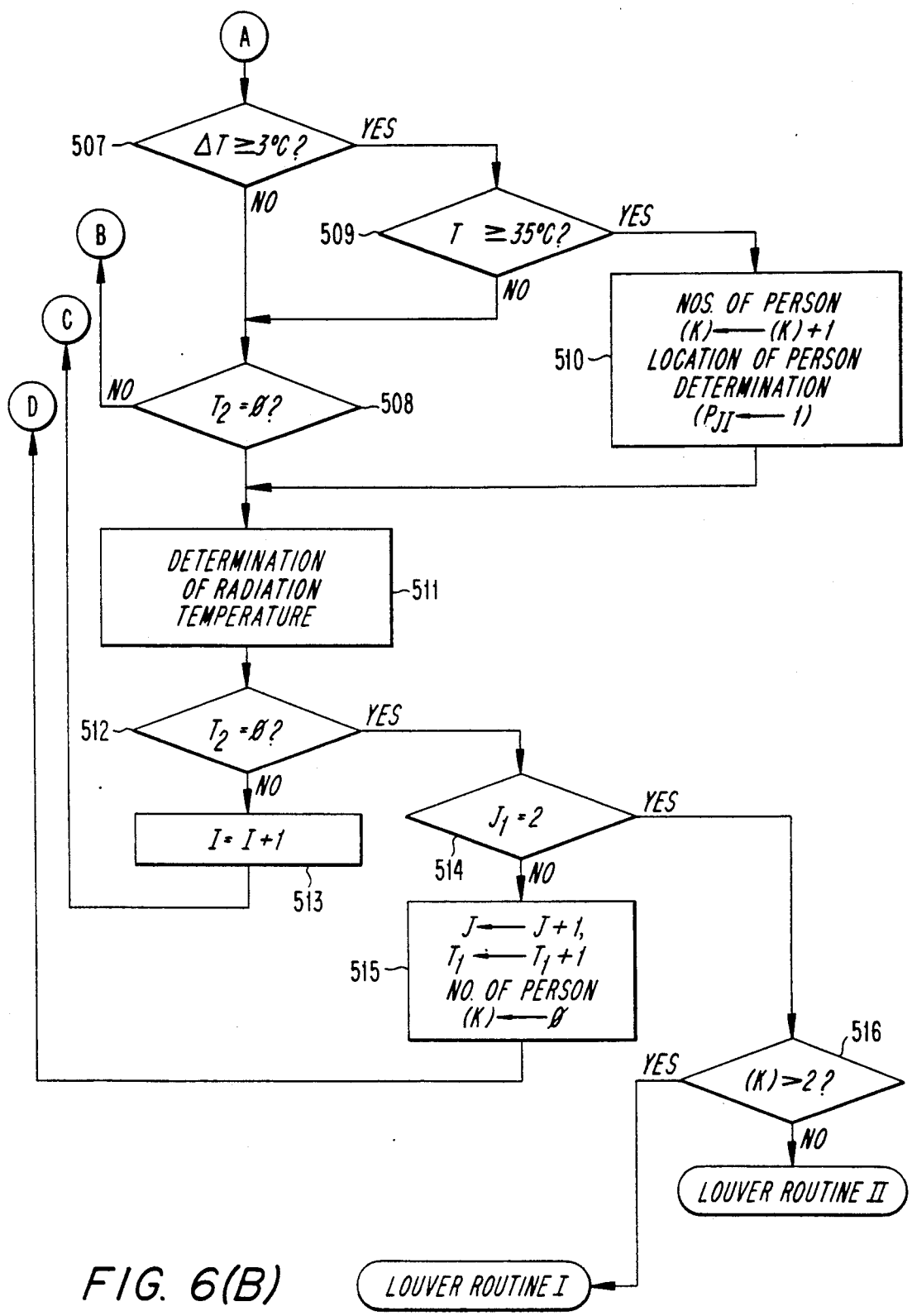

Also, another embodiment of the invention improves a method of controlling an amount of forced air in a direction dependent upon the existence or non-existence and the movement of a person. Referring to FIG. 6, an air conditioner 1 is first reset by applying the power source thereto. At the initial reset step 501, a microprocessor 4 receives signals of the operation mode, for example, a cooling mode or a warming mode and the setting temperature from the remote control 3 or other control portion having a plurality of input keys and then operates the air conditioner. At that time, the sensor of the infrared-ray detecting portion 2 is sequentially moved in upward, downward, leftward and rightward directions as shown in FIG. 3 and scans areas A-L divided as shown in FIG. 1 to be detected for determining the existence or non-existence of a person. While the sensor detects the room temperature $T_b$, the existence or non-existence and the number of people are detected.

Next, the microprocessor 4 performs step 502 to set a monitoring timer $T_1$, reset a counter and set the frequency J of the human body detection at 1, in which the monitoring timer $T_1$ is for determining the frequency of the human body detection, but this embodiment is limited by two times for the purpose of clarifying the explanation. The microprocessor 4 performs step 503 to set a detecting area I at 1 and the detecting time of the detection duration timer $T_2$ at the predetermined time Tc, for example 10 seconds, corresponding to every area. At step 505 the detection duration timer $T_2$ is enabled to be decremented by one as well as to enable the sensor of the infrared-ray detecting portion 2 to detect the temperatures of each of areas A-L which divide a room into the predetermined number of areas.

Step 505 goes to step 506 to calculate the temperature difference $\Delta T$ between the radiation temperature $T_a$ of a person and the room temperature $T_b$ which are detected at the area I by means of the infrared-ray detecting portion 2. Step 506 proceeds to step 507 to determine whether the value of the temperature difference $\Delta T$ is over the predetermined temperature, for example, 3° C. If the temperature difference $\Delta T$ is lower than 3° C., step 507 goes to step 508 to judge whether the detecting time $T_2$ is elapsed at the area I to be first detected. After the lapse of the predetermined detecting time $T_2$, at step 511 the radiation temperature is determined and at step 512 the completion of the scanning throughout the total detecting area I is determined. Thereafter, the microprocessor 4 continues to operate the infrared-ray detecting portion 2 thereby to detect other detecting areas I+1 by increasing the counting of the detecting area I by one.

On the other hand, when the temperature difference $\Delta T$ is higher than 3° C., step 507 goes to step 509 to judge whether the radiation temperature $T_a$ is over the predetermined temperature of 35° C. If not over 35° C., step 509 performs next steps through step 508. If over 35° C., step 509 goes to step 510 to judge the number of people K and their location $P_{JI}$. Continuously, step 510 goes on to step 511 to determine the radiation temperature, and step 511 proceeds to step 512 to determine the completion of the detection with respect to areas I. If not completed, the counting of the detecting area is incremented at step 513 and the program returned to step 503 to identify the number of people K and their location $P_{JI}$. Therefore, the microprocessor 4 determines the existence and the number of people and the radiation temperature in the corresponding areas B through L as shown in FIGS. 4A and 4B.

Then, when the completion of the area detection with respect to the number of people and their location, and the radiation temperature is determined, the microprocessor 4 performs step 514 to determine whether the detecting frequency J of areas I is two times. If the detecting frequency is not two times, at step 515 the detecting frequency count J is increased and the monitoring timer $T_1$ is incremented by one and variable for the number of a person K is reset, for calculating the number of people. These procedures are repeatedly performed for the identification of the number and location of people and the radiation temperature throughout areas I to be detected in a room.

Figure 8:
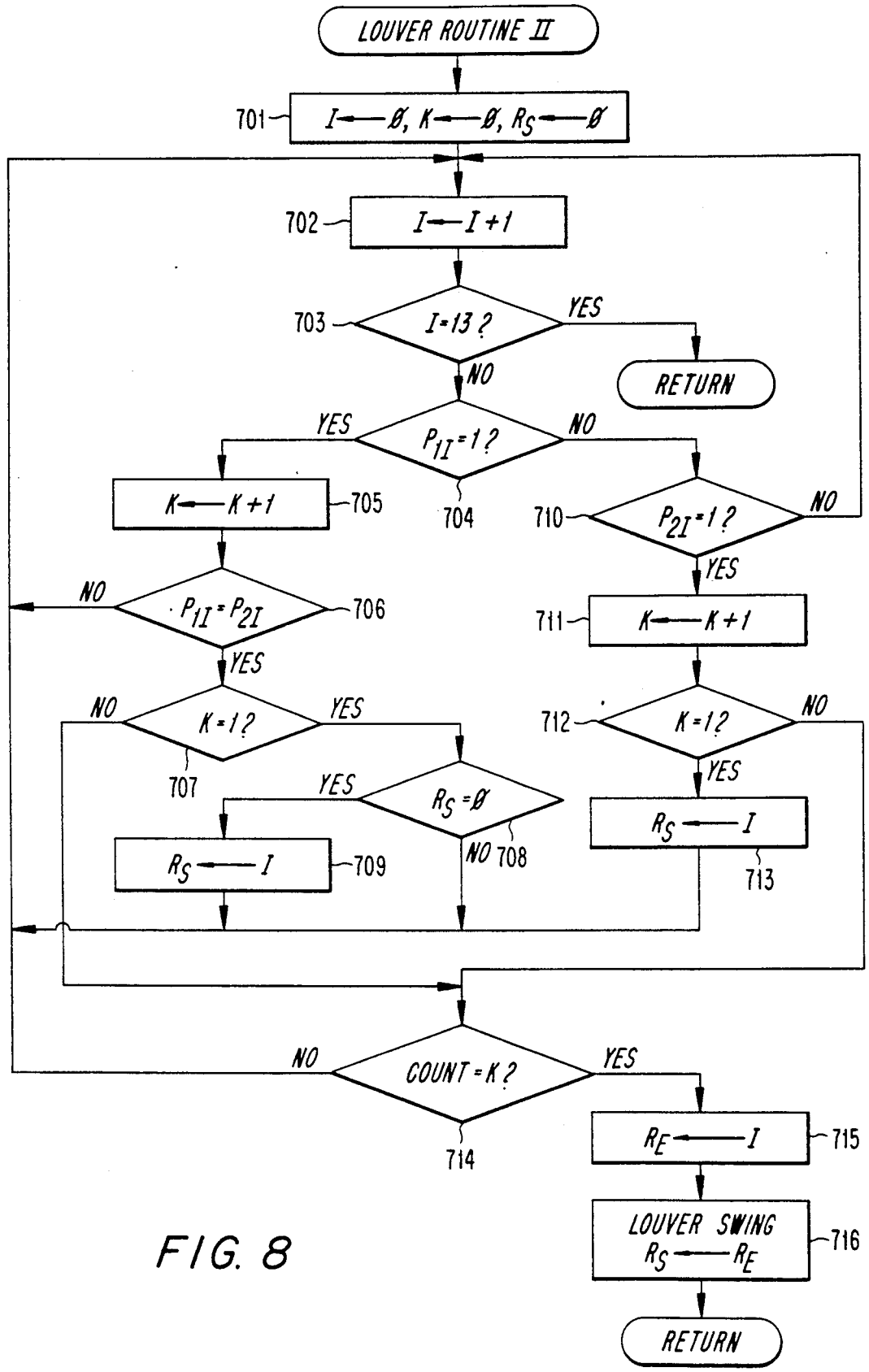

On the other hand, when the detecting frequency is two times, step 514 jumps to 516 to determine whether the number of people is over 2. If over 2, the louver control routine I is performed as illustrated in FIG. 7. Otherwise, the louver control routine II is performed as illustrated in FIG. 8.

The louver control routine I is initiated when the detected person number K is not more than 2. The microprocessor 4 executes step 601 to read the setting temperature $T_s$ of the remote control, the detected area I and the detecting frequency J. Step 601 goes to step 602 to increment the counting of the detecting area I by one so as to detect the temperature of the corresponding area. Next, step 602 proceeds to step 603 to determine whether the detection of the existence of a person is finished in the total area to be detected. If not finished, at step 604 it is determined whether the remote control temperature $T_s$ is higher than the room temperature $T_b$. If the set temperature $T_s$ is above the room temperature $T_b$ or the room temperature $T_b$ is below the set temperature $T_s$, step 604 goes to step 605 to determine whether the existence of a person $P_s$ in areas to be detected is confirmed. When any person $P_s$ occupies the room, at step 606 the room blower fan is caused to operate weakly, as well as to set the direction of the louver to the location of a person $P_s$. On the other hand, when the set temperature Ts is lower than the room temperature $T_b$, step 604 goes to step 607 to determine whether there exists a person $P_s$ in the total area, in order to rapidly cool the room. If a person is not detected, at step 608 the room blower fan (RPM) is operated as well as to set the direction $P_{JI}$ of the louver at a horizontal plane.

When the temperature $T_s$ is determined to be higher than the room temperature $T_b$ at step 604, and the existence of a person $P_s$ is detected at step 607, step 607 proceeds to step 609 to enable the room blower fan (RPM) to be operated strongly as well as to set the direction $P_{JI}$ of the louver at the location of a person.

Returning to step 603, when the person detection corresponding to the twelve (12) areas of detection is finished (I=13), step 603 jumps to step 610 to clear the counting of the detecting area I and then increase the detecting frequency count J. Thereafter, at step 611 it is determined whether the detecting frequency is three times. If not, the process returns to step 605 to perform the next steps. Otherwise, the process returns from performing the louver control routine I.

The louver control routine II is initiated when the detected number of people K is over 2. The microprocessor 4 executes step 601 to read the detected area I, the number of people K and the initial position Rs of the louver. Step 701 goes to step 702 to increase the counting of the detecting area I by one so as to detect the temperature of the corresponding area. Next, step 702 proceeds to step 703 to determine whether the detection of the existence of people in the total areas is finished (I=13). If finished, it is returned to the original state. If not finished, at step 704 it is determined whether the detecting frequency J is one, and the existence of a person $P_{1I}$ in a predetermined area to be detected is confirmed.

When the person detection is performed once, and a person $P_{1I}$ is detected, step 704 goes to step 705 to increase the number of people K by one. Next, when it fails to determine whether the existence of a person was the same one detected at the first and second person detection at step 706, the microprocessor 4 performs step 702, again. If the existence of a person is detected, at step 707 the number of people K is judged. If the number of people K is equal at the time of first and second person detection, step 707 proceeds to step 708 to determine whether the louver is set at the initial position. If the louver is at the initial position, at step 709 the louver is moved to the area I where a person was detected. Thereafter, during the procedures of repeating the performance of step 702 to step 709, if the number of people K is not equal, step 707 jumps to step 714 to determine whether the counting value of the counter is equal to the number of people K. If not equal, step 702 is performed. If equal, step 714 goes to step 715 to set the position $R_E$ of the louver at the final position, and then there is performed at step 716 to enable the louver to be swung from the initial position to the final position.

On the other hand, when the person detection is performed once, and the number of people $P_{1I}$ is not detected, step 704 goes to step 710 to determine whether the existence of a person in the detecting area I is detected at the time of second person detecting $P_{2I}$. If a person is in the detecting area, step 710 goes to step 711 to increase the number of people K by one. Next, there is determined at step 712 whether the existence of a person is detected. If yes, step 712 proceeds to step 713 to set the initial position of the louver at the detected person's position. On the contrary, if no, step 712 jumps to step 714 to determine whether the counting value of the counter is equal to the number of people K. If not equal, step 702 is performed. If equal, step 714 goes to step 715 to set the position $R_E$ of the louver at the final position, and then at step 716 the louver is enabled to be swung from the initial position to the final position.

As described above, the invention controls an air conditioner in a manner that the existence or non-existence and the movement of a person are detected as well as the number of people based on the radiation temperature detected from the human body are determined, so that the direction and an amount of forced air is adjusted, thereby forming the air conditioning environment first at the area a person occupies, while the temperature of the total area in room is adjusted, thereby enabling users to feel a comfortable environment at any location in a room. Also the invention can be adapted to a warming apparatus by controlling the direction and an amount of forced air toward areas that a person does not occupy in the room.

What is claimed is:

1. A method of controlling an air conditioning system, said method comprising steps of:

detecting a room temperature;

enabling an infrared-ray detecting means to detect infrared rays in a total area divided into a predetermined number of divided areas to detect a radiation temperature of each of the divided areas for a predetermined time period;

calculating the difference between the detected radiation temperature and the detected room temperature;

judging whether the temperature difference is above a predetermined temperature difference and, if over a predetermined temperature difference, judging whether said detected radiation temperature is above a predetermined radiation temperature to determine the location of a person;

determining a completion of the detection with respect to the location of a person and the total area;

calculating the difference between the room temperature and a set temperature to determine whether the existence of a person is detected and comparing the temperature of an area in which a person is detected with the temperature of areas adjacent to the area in which a person a detected; and controlling a direction of blowing wind by a louver, an amount of blowing wind of a room blower fan and the operation of a compressor in response to results of said judging and said calculating steps.

2. The method according to claim 1, further comprising the steps of:

determining the area that the existence of a person is detected;

comparing the room temperature with the set temperature if the detection of room areas is not completed;

detecting the temperature of an area adjacent to the area in which at least one person is detected when the room temperature is below the set temperature and comparing the detected temperature with a predetermined temperature; and enabling the louver to be swung to an adjacent area.

3. The method according to claim 1, further comprising steps of:

performing a weak operation of the room blowing fan and setting the direction of the louver at a vertical plane if the room temperature is lower than the setting temperature and the existence of a person is not detected, so that the direction and an amount of blowing wind are controlled.

4. The method according to claim 1, further comprising steps of:

comparing the room temperature with the set temperature;

setting the direction of the louver at a horizontal plane if the room temperature is higher than the set temperature and the existence of a person is not detected; and setting the direction of the louver at an area adjacent to an area in which a person is detected if the room temperature is higher than the set temperature and the existence of a person is detected, thereby controlling the direction and an amount of blowing wind.

5. A method of controlling an air conditioning system for detecting a room temperature, comparing the room temperature with the previously set temperature and adjusting the room temperature to the set temperature, comprising the steps of:

detecting the existence or non-existence and the moving area of at least one person;

calculating the difference between the room temperature and the radiation temperature emanated from a person;

determining the radiation temperature and the location of a person; and controlling a direction and an amount of blowing wind of each of a louver and a room blower fan in at least two steps according to the number and place of said at least one person.

6. The method according to claim 5, furthermore comprising steps of:

determining a number of people on the basis of the area in which people dwell and the detection frequency; and controlling the direction of the louver and the RPM of the room blower fan according to the room area temperature when the number of people is one.

7. The method according to claim 6, further comprising the steps of:

enabling the louver to be swung from an initial position to a final position directing blowing wind at the area in which people dwell if the number of people is two.

8. An air conditioning system for detecting a room temperature, comparing the room temperature with the previously set temperature and adjusting the room temperature to the setting temperature, comprising:

means for moving toward an area divided into a predetermined number of divided areas in turn in upward, downward, leftward and rightward directions so as to detect infrared-rays emanated from a person; and means for controlling the movement of the detecting means to a predetermined divided area, determining the existence or non-existence and the movement of a person, and controlling the driving direction of a louver, an operation of a room blower fan and a compressor in response thereto.

9. An air conditioning control method for controlling room temperature, said method comprising the steps of:

detecting radiation temperature for a predetermined time period in each of a plurality of areas;

detecting an ambient temperature;

calculating a difference between said detected radiation temperature and said ambient temperature;

judging whether said calculated temperature difference is above a predetermined temperature difference; and controlling a direction of temperature conditioned forced air in response to a result of said judging step.

10. The control method according to claim 9, comprising the further step of:

determining whether said detected radiation temperature is equal to or greater than a predetermined temperature to determine a location of a person, wherein said controlling step is responsive to said determining step.

11. The control method according to claim 9, wherein said temperature difference is judged after said radiation temperature is detected in all of said plurality of areas.

12. The control method according to claim 11, comprising the further steps of:

comparing said ambient temperature to a set ambient temperature when radiation temperature detection is not completed for all of said plurality of areas;

detecting a temperature of an area adjacent to an area in which a person has been determined to be located when said ambient temperature is below said set ambient temperature;

comparing said detected adjacent area temperature with a predetermined set temperature; and enabling control of said direction of said forced temperature controlled air to be toward said adjacent area.

* * * * *